United States Patent
Naganuma (10) Patent No.: US 6,515,776 B1
(45) Date of Patent: Feb. 4, 2003

(54) OPTICAL DEVICE, TERMINAL UNIT, AND SYSTEM FOR WAVELENGTH DIVISION MULTIPLEXING

(75) Inventor: Norihisa Naganuma, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/314,944

(22) Filed: May 20, 1999

(30) Foreign Application Priority Data

Sep. 9, 1998 (JP) .......................................... 10-255434

(51) Int. Cl.$^7$ ................................................. H04J 14/02
(52) U.S. Cl. ........................ 359/124; 359/127; 359/128; 359/131
(58) Field of Search ................................ 359/124, 131, 359/127, 115, 128, 188, 195

(56) References Cited

U.S. PATENT DOCUMENTS

| | | | | |
|---|---|---|---|---|
| 4,244,045 A | * | 1/1981 | Nosu et al. | |
| 5,408,100 A | * | 4/1995 | Gallivan | |
| 5,786,915 A | * | 7/1998 | Scobey | |
| 6,167,171 A | * | 12/2000 | Grasis et al. | |

* cited by examiner

Primary Examiner—Leslie Pascal
Assistant Examiner—Dzung Tran
(74) Attorney, Agent, or Firm—Staas & Halsey LLP (57) ABSTRACT

Disclosed herein is an optical device including a fiber collimator and a plurality of fiber assemblies sequentially optically coupled to the fiber collimator by a reflected light path of a substantially parallel beam. The fiber collimator includes an optical fiber and a lens opposed to the optical fiber. Each fiber assembly includes an optical filter for providing the reflected light path, an optical fiber optically coupled to the optical filter by its transmitted light path, and a lens provided between the optical filter and this optical fiber. The lens of the i-th fiber assembly has a focal length equal to or greater than that of the lens of the (i−1)-th fiber assembly. With this configuration, a deviation in coupling loss or insertion loss due to beam divergence in the reflected light path can be reduced.

22 Claims, 6 Drawing Sheets

OPTICAL DEVICE, TERMINAL UNIT, AND SYSTEM FOR WAVELENGTH DIVISION MULTIPLEXING

BACKGROUND OF THE INVENTION

1. Field of the Invention

The present invention relates to an optical device, terminal unit, and system for wavelength division multiplexing.

2. Description of the Related Art

In recent years, the processing of massive amounts of information has been needed with the development of an advanced information society, and optical fiber communication fit for a large capacity has been applied to a transmission network for transmitting information. While a transmission rate of information in optical fiber communication has already reached 2.4 Gb/s or 10 Gb/s, a further increase in transmission capacity will be needed in a motion picture captured communication system that is expected to be put to practical use in the future. For example, a transmission capacity exceeding 1 terabits per second (Tb/s) will be needed in a trunk system.

Research and development on wavelength division multiplexing (WDM) is being actively carried out to increase a transmission capacity in optical fiber communication. In a system adopting WDM, a plurality of optical carriers having different wavelengths are used. The optical carriers are individually modulated to obtain a plurality of optical signals. The optical signals are next wavelength division multiplexed by an optical multiplexer to obtain WDM signal light. The WDM signal light is next launched into an optical fiber transmission line. At a receiving end, the WDM signal light received is separated into a plurality of individual optical signals by an optical demultiplexer to reproduce transmitted data according to each optical signal. Accordingly, by applying WDM to such a system, a transmission capacity in a single optical fiber can be increased according to the number of WDM channels.

As an optical device usable as each of the optical multiplexer and the optical demultiplexer, an arrayed waveguide grating (AWG) is known in the art. For example, the AWG includes a first slab waveguide to which a plurality of input optical waveguides are connected, a second slab waveguide to which a plurality of output optical waveguides are connected, and a plurality of connecting optical waveguides provided between the first and second slab waveguides and having different optical path lengths. The connecting optical waveguides and the first and second slab waveguides operate as a diffraction grating, so that each input optical waveguide and each output optical waveguide are coupled by a specific wavelength. Accordingly, by connecting the input optical waveguides to a plurality of optical transmitters, respectively, and connecting one of the output optical waveguides to a single optical fiber transmission line, this AWG functions as an optical multiplexer at a transmitting end. Further, by connecting one of the input optical waveguides to a single optical fiber transmission line and connecting a plurality of optical receivers to the output optical waveguides, respectively, this AWG functions as an optical demultiplexer at a receiving end.

Thus, an AWG may be provided by optical waveguides, so that it is suitable for size reduction of an optical multiplexer and an optical demultiplexer. However, an insertion loss by an AWG is generally as large as about 8 dB, and in the case of applying an AWG to each of an optical multiplexer and an optical demultiplexer in a system adopting WDM, a total insertion loss (associated loss) by the optical multiplexer and the optical demultiplexer becomes about 16 dB.

As a conventional more typical optical device usable as each of an optical multiplexer and an optical demultiplexer, there is an optical device configured by sequentially optically coupling a plurality of optical filters by a reflected light path of a substantially parallel beam. Each of the optical filters is configured by using a filter film such as a multilayer dielectric film. However, the beam diameter of the parallel beam or the Gaussian distribution of its optical power determined in relation to a fiber mode is gradually expanded with an increase in optical path length of the reflected light path. As a result, a deviation in insertion loss between wavelength channels tends to be generated.

SUMMARY OF THE INVENTION

It is therefore an object of the present invention to provide an optical device suitable as an optical multiplexer and/or an optical demultiplexer reduced in insertion loss and in deviation in insertion loss. It is another object of the present invention to provide a terminal unit and a system each including such an optical device.

The optical device according to the present invention comprises a fiber collimator and a plurality of fiber assemblies sequentially optically coupled to the fiber collimator by a reflected light path of a substantially parallel beam. The fiber collimator comprises an optical fiber and a lens opposed to the optical fiber. Each of the fiber assemblies comprises an optical filter for providing the reflected light path, an optical fiber optically coupled to the optical filter by its transmitted light path, and a lens provided between the optical filter and this optical fiber.

In the optical device according to a first aspect of the present invention, the lens of the i-th (i is an integer satisfying $2 \leq i \leq N$ where N represents the number of the fiber assemblies, which is an integer greater than 1) fiber assembly has a focal length equal to or greater than that of the lens of the (i−1)-th fiber assembly, and the lens of the N-th fiber assembly has a focal length greater than that of the lens of the first fiber assembly. With this configuration, a deviation in insertion loss due to beam divergence in the reflected light path can be eliminated, thus achieving one of the objects of the present invention.

In the optical device according to a second aspect of the present invention, each optical filter has a reflecting surface for providing the reflected light path, and at least one of the reflecting surfaces of the fiber assembly is formed as a concave surface. With this configuration, a deviation in insertion loss due to beam divergence in the reflected light path can be eliminated, thus achieving one of the objects of the present invention.

In accordance with a third aspect of the present invention, there is provided a terminal unit comprising a plurality of optical transmitters for outputting a plurality of optical signals having different wavelengths, respectively, and an optical multiplexer optically connected to the optical transmitters for outputting WDM signal light obtained by wavelength division multiplexing the optical signals. The optical multiplexer is provided by the optical device mentioned above. Preferably, the optical multiplexer is provided by the optical device according to the first or second aspect of the present invention. The fiber assemblies are optically connected to the optical transmitters, respectively, and the WDM signal light is output from the fiber collimator.

In accordance with a fourth aspect of the present invention, there is provided a terminal unit comprising an optical demultiplexer for receiving WDM signal light obtained by wavelength division multiplexing and for separating the WDM signal light into a plurality of optical signals having different wavelengths, and a plurality of optical receivers optically connected to the optical demultiplexer for receiving the optical signals, respectively. The optical demultiplexer is provided by the optical device mentioned above. Preferably, the optical demultiplexer is provided by the optical device according to the first or second aspect of the present invention. The WDM signal light is supplied to the fiber collimator, and the fiber assemblies are optically connected to the optical receivers, respectively.

In accordance with a fifth aspect of the present invention, there is provided a system comprising first and second terminal units adapted to wavelength division multiplexing, and an optical fiber transmission line connecting the first and second terminal units. Each or at least one of the first and second terminal units comprises the optical device mentioned above. Preferably, this optical device is provided by the optical device according to the first or second aspect of the present invention.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
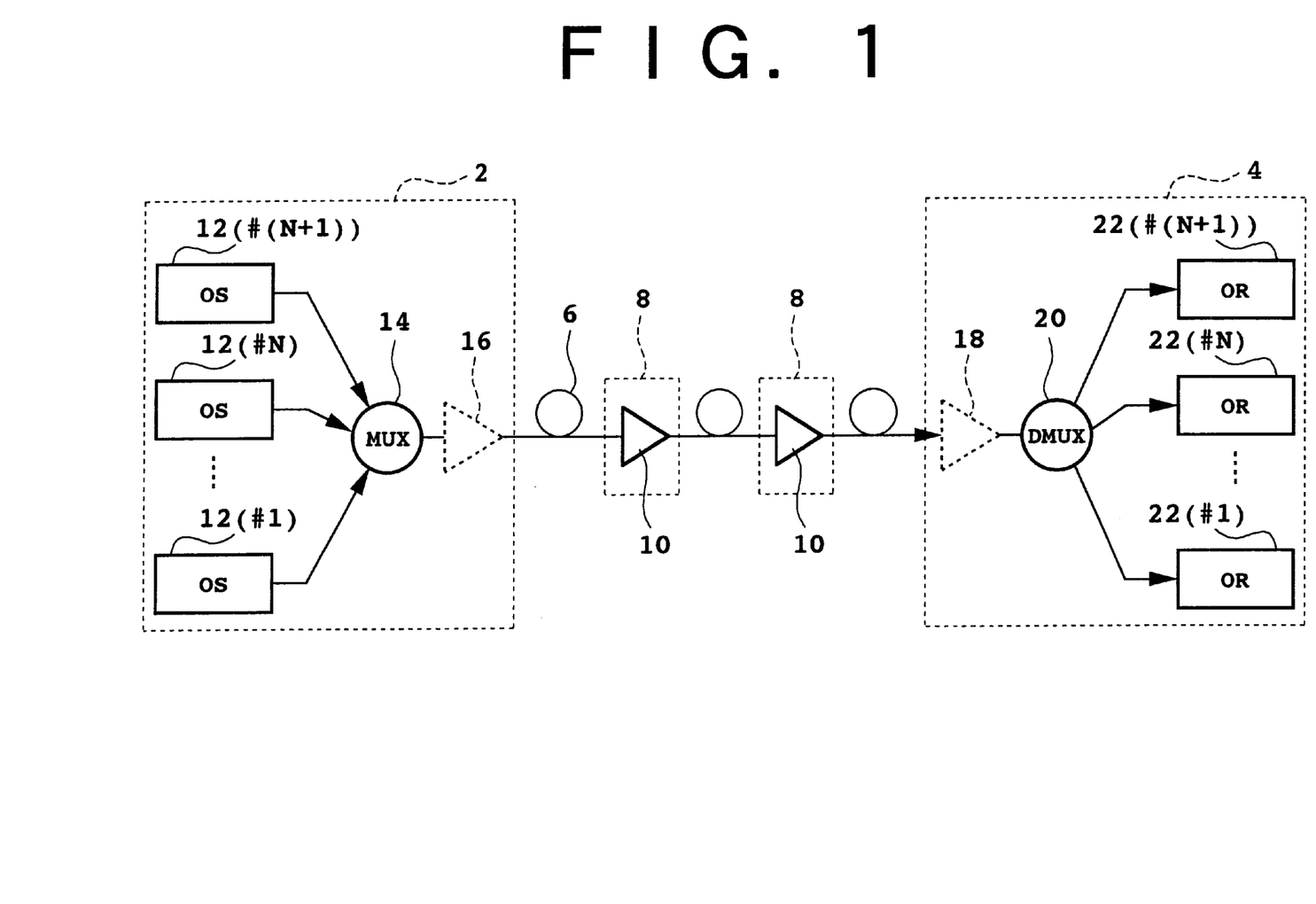
FIG. 1 is a block diagram showing a preferred embodiment of the system according to the present invention.

Referring to FIG. 1, there is shown a preferred embodiment of the optical fiber communication system according to the present invention. This system includes first and second terminal units 2 and 4 each adapted to wavelength division multiplexing (WDM), and an optical fiber transmission line 6 connecting the first and second terminal units 2 and 4. A plurality of (e.g., two as shown) optical repeaters 8 are arranged along the optical fiber transmission line 6. Each optical repeater 8 includes an optical amplifier 10 provided by an erbium doped fiber amplifier (EDFA), for example. The plural optical repeaters 8 may be replaced by a single similar optical repeater.

The first terminal unit 2 includes a plurality of optical transmitters (OS) 12(#1 to #(N+1)) (N is an integer greater than 1) for outputting a plurality of optical signals having different wavelengths, and an optical multiplexer (MUX) 14 optically connected to the optical transmitters 12(#1 to #(N+1)) for wavelength division multiplexing the plural optical signals to output resultant WDM signal light. The WDM signal light obtained by wavelength division multiplexing in the optical multiplexer 14 is launched into the optical fiber transmission line 6 directly or after amplification by an optical amplifier 16 as a postamplifier.

In the second terminal unit 4, the WDM signal light transmitted by the optical fiber transmission line 6 is supplied into an optical demultiplexer (DMUX) 20 directly or after amplification by an optical amplifier 18 as a preamplifier. The optical demultiplexer 20 separates the supplied WDM signal light into a plurality of optical signals having different wavelengths. A plurality of optical receivers (OR) 22(#1 to #(N+1)) are optically connected to the optical demultiplexer 20 to respectively receive the plural optical signals from the optical demultiplexer 20.

According to the system shown in FIG. 1, WDM is applied to each of the terminal units 2 and 4, so that a transmission capacity in the optical fiber transmission line 6 can be increased according to the number of WDM channels (N+1). Further, the loss of the WDM signal light in the optical fiber transmission line 6 can be compensated by the optical repeaters 8, thereby allowing long-haul transmission.

Figure 2:
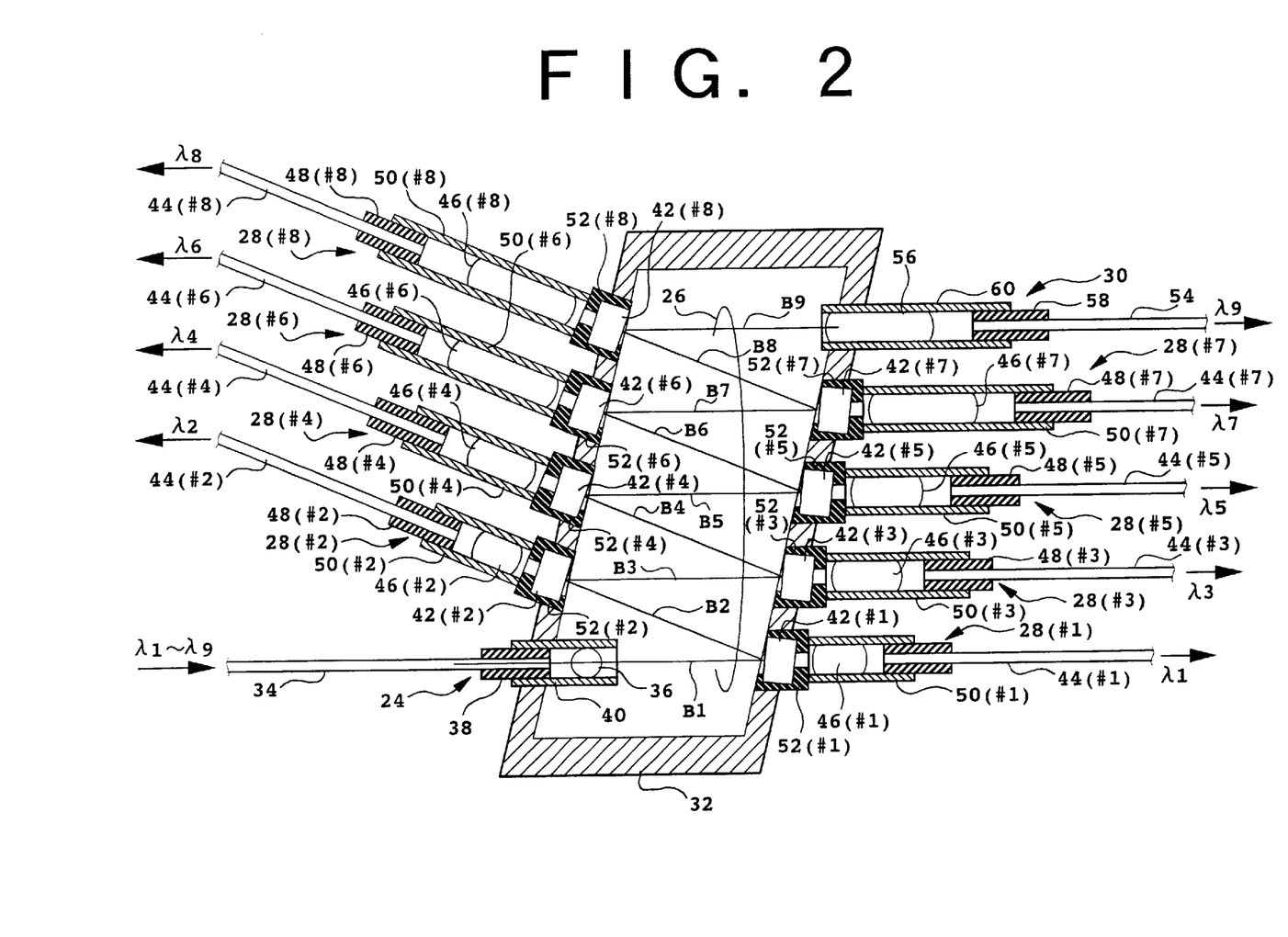
FIG. 2 is a sectional view showing a preferred embodiment of the optical device according to the present invention.

FIG. 2 is a sectional view showing a preferred embodiment of the optical device according to the present invention. This optical device is usable as each of the optical multiplexer 14 and the optical demultiplexer 20 shown in FIG. 1. For easy understanding of the configuration and operation of this optical device in the following description, it is assumed that N=8 and this optical device is used as the optical demultiplexer 20 shown in FIG. 1.

The optical device shown in FIG. 2 includes a fiber collimator 24, eight fiber assemblies 28(#1 to #8) sequentially optically coupled to the fiber collimator 24 by a reflected light path 26 of a substantially parallel beam, and an additional fiber assembly 30 optically coupled to the fiber collimator 24 by the reflected light path 26 and distinguished from the fiber assemblies 28(#1 to #8). All of the fiber collimator 24 and the fiber assemblies 28(#1 to #8) and 30 are fixed to a housing 32, and the reflected light path 26 is provided in the housing 32. This optical device is supplied with the WDM signal light transmitted by the optical fiber transmission line 6 (see FIG. 1). In this preferred embodiment, the WDM signal light is obtained by wavelength division multiplexing nine channels ((N+1) channels) of optical signals having different wavelengths $\lambda 1$ to $\lambda 9$.

The fiber collimator 24 includes an optical fiber 34 supplied with the WDM signal light, and a lens 36 for collimating the WDM signal light emerging from an end face of the optical fiber 34 to provide a beam B1 as a substantially parallel beam. The optical fiber 34 is inserted and fixed in a ferrule 38. The ferrule 38 and the lens 36 are held in a sleeve 40. The sleeve 40 is fixed to the housing 32.

The first fiber assembly 28(#1) includes an optical filter 42(#1) having a reflecting point (or area) for providing the reflected light path 26, an optical fiber 44(#1) optically coupled to the optical filter 42(#1) by its transmitted light path, and a lens 46(#1) provided between the optical filter 42(#1) and the optical fiber 44(#1). The optical fiber 44(#1) is inserted and fixed in a ferrule 48(#1). The ferrule 48(#1) and the lens 46(#1) are held by a sleeve 50(#1). The sleeve 50(#1) is fixed to a holder 52(#1). The holder 52(#1) is fixed to the housing 32. The optical filter 42(#1) is provided in the holder 52(#1) so that an angle of incidence of the beam B1 upon the optical filter 42(#1) can be finely adjusted.

Similarly, the i-th (i is an integer satisfying $2 \leq i \leq 8$ (=N)) fiber assembly 28(#i) includes an optical filter 42(#i) having a reflecting point (or area) for providing the reflected light path 26, an optical fiber 44(#i) optically coupled to the optical filter 42(#i) by its transmitted light path, and a lens 46(#i) provided between the optical filter 42(#i) and the optical fiber 44(#i). The optical fiber 44(#i) is inserted and fixed in a ferrule 48(#i). The ferrule 48(#i) and the lens 46(#i) are held by a sleeve 50(#i). The sleeve 50(#i) is fixed to a holder 52(#i). The holder 52(#i) is fixed to the housing 32. The optical filter 42(#i) is provided in the holder 52(#i) so that an angle of incidence of light upon the optical filter 42(#i) can be finely adjusted.

The fiber assembly 30 includes an optical fiber 54 and a lens 56 opposed to the optical fiber 54. The optical fiber 54 is inserted and fixed in a ferrule 58. The ferrule 58 and the lens 56 are held by a sleeve 60. The sleeve 60 is fixed to the housing 32.

Figure 3:
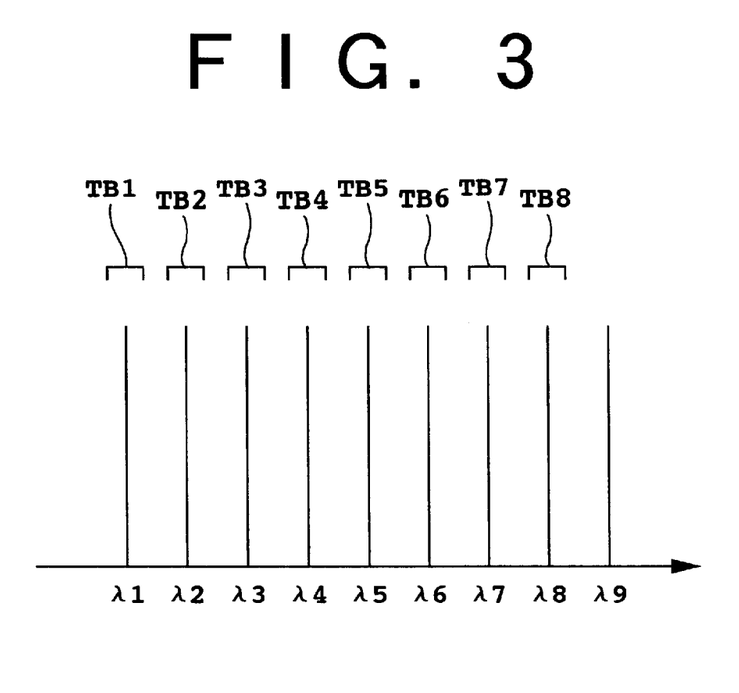
FIG. 3 is a diagram for illustrating wavelength arrangement of WDM signal light.

FIG. 3 illustrates wavelength arrangement of the WDM signal light supplied to the optical device shown in FIG. 2. As shown in FIG. 3, the wavelengths $\lambda 1$ to $\lambda 9$ of nine channels, are arranged in ascending order and the wavelength spacings or frequency spacings are substantially equal to each other.

The optical filter 42(#1) of the first fiber assembly 28(#1) has a transmission band TB1 including the wavelength $\lambda 1$ and not including other wavelengths, and the optical filter 42(#i) of the i-th fiber assembly 28(#i) has a transmission band TB1 including the wavelength $\lambda i$ and not including other wavelengths. That is, the transmission bands TB1 to TB8 are different from one to another and are not overlapped. The transmittance and reflectance of each optical filter with respect to light having the wavelength included in the corresponding transmission band are substantially 100% and 0%, respectively, and the transmittance and reflectance of each optical filter with respect to light having the wavelengths not included in the corresponding transmission band are substantially 0% and 100%, respectively. The operation of this optical device will now be described with reference to FIG. 2 again.

The beam B1 by the WDM signal light output from the fiber collimator 24 is supplied to the fiber assembly 28(#1). An optical signal having the wavelength $\lambda 1$ is transmitted by the optical filter 42(#1), and is focused by the lens 46(#1) to enter the optical fiber 44(#1). Optical signals having the other wavelengths $\lambda 2$ to $\lambda 9$ are reflected by the optical filter 42(#1) to become a beam B2 provided by a substantially parallel beam. The beam B2 is next supplied to the fiber assembly 28(#2).

In the fiber assembly 28(#2), the optical signal having the wavelength $\lambda 2$ is transmitted by the optical filter 42(#2), and is focused by the lens 46(#2) to enter the optical fiber 44(#2). The optical signals having the other wavelengths $\lambda 3$ to $\lambda 9$ are reflected by the optical filter 42(#2) to become a beam B3 provided by a substantially parallel beam. The beam B3 is next supplied to the fiber assembly 28(#3).

In the fiber assembly 28(#3), the optical signal having the wavelength $\lambda 3$ is transmitted by the optical filter 42(#3), and is focused by the lens 46(#3) to enter the optical fiber 44(#3). The optical signals having the other wavelengths $\lambda 4$ to $\lambda 9$ are reflected by the optical filter 42(#3) to become a beam B4 provided by a substantially parallel beam. The beam B4 is next supplied to the fiber assembly 28(#4).

In the fiber assembly 28(#4), the optical signal having the wavelength $\lambda 4$ is transmitted by the optical filter 42(#4), and is focused by the lens 46(#4) to enter the optical fiber 44(#4). The optical signals having the other wavelengths $\lambda 5$ to $\lambda 9$ are reflected by the optical filter 42(#4) to become a beam B5 provided by a substantially parallel beam. The beam B5 is next supplied to the fiber assembly 28(#5).

In the fiber assembly 28(#5), the optical signal having the wavelength $\lambda 5$ is transmitted by the optical filter 42(#5), and is focused by the lens 46(#5) to enter the optical fiber 44(#5). The optical signals having the other wavelengths $\lambda 6$ to $\lambda 9$ are reflected by the optical filter 42(#5) to become a beam B6 provided by a substantially parallel beam. The beam B6 is next supplied to the fiber assembly 28(#6).

In the fiber assembly 28(#6), the optical signal having the wavelength $\lambda 6$ is transmitted by the optical filter 42(#6), and is focused by the lens 46(#6) to enter the optical fiber 44(#6). The optical signals having the other wavelengths $\lambda 7$ to $\lambda 9$ are reflected by the optical filter 42(#6) to become a beam B7 provided by a substantially parallel beam. The beam B7 is next supplied to the fiber assembly 28(#7).

In the fiber assembly 28(#7), the optical signal having the wavelength $\lambda 7$ is transmitted by the optical filter 42(#7), and is focused by the lens 46(#7) to enter the optical fiber 44(#7). The optical signals having the other wavelengths $\lambda 8$ and $\lambda 9$ are reflected by the optical filter 42(#7) to become a beam B8 provided by a substantially parallel beam. The beam B8 is next supplied to the fiber assembly 28(#8).

In the fiber assembly 28(#8), the optical signal having the wavelength $\lambda 8$ is transmitted by the optical filter 42(#8), and is focused by the lens 46(#8) to enter the optical fiber 44(#8). The optical signal having the other wavelength $\lambda 9$ is reflected by the optical filter 42(#8) to become a beam B9 provided by a substantially parallel beam. The beam B9 is next supplied to the fiber assembly 30.

In the fiber assembly 30, the beam B9, i.e., the optical signal having the wavelength $\lambda 9$, is focused by the lens 56 to enter the optical fiber 54.

According to an aspect of the present invention, the present invention is characterized by setting of a focal length of each lens. More specifically, the lens 46(#i) of the i-th fiber assembly 28(#i) has a focal length equal to or greater than that of the lens 46(#(i−1)) of the (i−1)-th fiber assembly 28(#(i−1)), and the lens 46(#8) of the eighth (the N-th) fiber assembly 28(#8) has a focal length greater than that of the lens 46(#1) of the first fiber assembly 28(#1).

Figure 4:
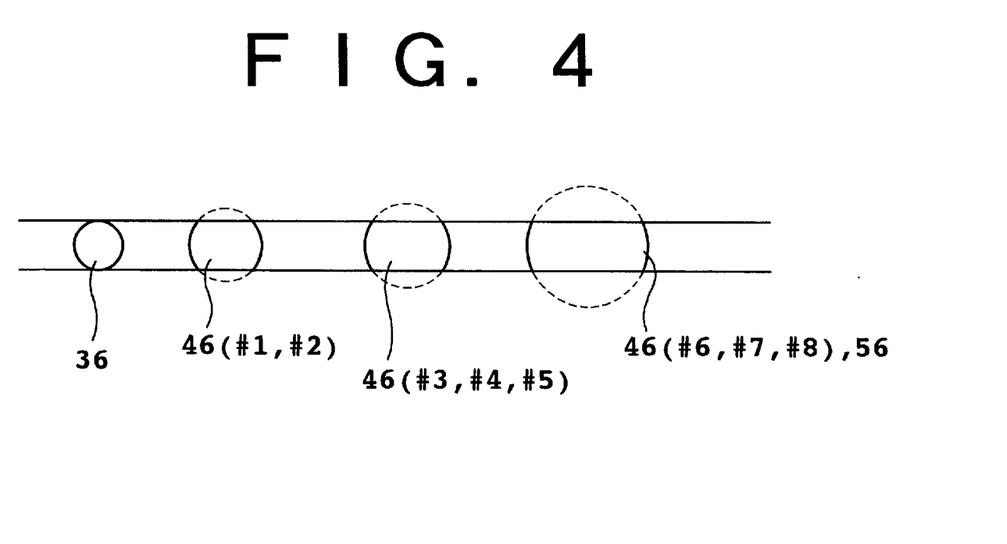
FIG. 4 is a diagram showing an example of design of lenses in the optical device shown in FIG. 2.

An example of design of the lenses in the optical device shown in FIG. 2 will now be described with reference to FIG. 4. Each of the lenses 36, 46(#1 to #8), and 56 is provided by a spherical lens in terms of operation. The diameter of the lens 36 is 2 mm, the diameter of each of the lenses 46(#1 and #2) is 2.5 mm, the diameter of each of the lenses 46(#3, #4, and #5) is 4 mm, and the diameter of each of the lenses 46(#6, #7, and #8) and 56 is 6 mm. The materials of all the lenses may be the same.

Particularly in this preferred embodiment, of all the lenses, each of the lenses 46(#1 to #8) and 56 having relatively longer focal lengths is provided by removing the outer circumference of a spherical lens by grinding or the like, in order to allow the use of the sleeves 50(#1 to #8) and 60 having the same diameter (see FIG. 2) and thereby effect size reduction and cost reduction of the optical device. The diameter of a substantially drum-shaped portion of each of the lenses 46(#1 to #8) and 56 left by this removal is equal to the diameter of the lens 36.

In general, the greater the diameter of a spherical lens, the greater the focal length of the lens, provided that the lens material is unchanged. Therefore, according to the example of design of the lenses described with reference to FIG. 4, the conditions according to the above-mentioned aspect of the present invention can be satisfied. An effect obtained by satisfying the conditions in the present invention will now be described.

Figure 5:
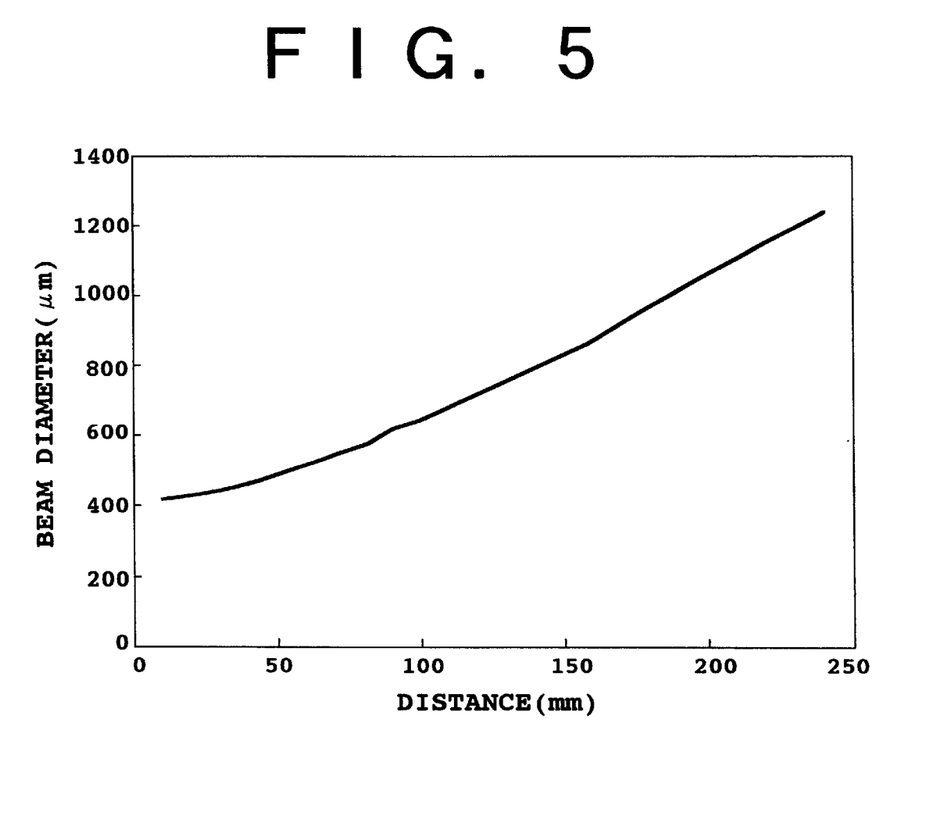
FIG. 5 is a graph for illustrating beam divergence in a parallel beam.

FIG. 5 is a graph for illustrating beam divergence of a parallel beam. More specifically, the graph shows an increase in diameter of a parallel beam obtained by collimating light emerging from an optical fiber end by a spherical lens having a diameter of 2.5 mm, with an increase in distance along an optical path.

In the case of assembling the optical device shown in FIG. 2 with a practical size, the length of each of the beams B1 to B9 is about 3 cm. Accordingly, it is understood that by making the distance along the reflected light path 26 correspond to the distance represented by the horizontal axis of the graph shown in FIG. 5, the beam diameter increases with an increase in distance from the fiber collimator 24. Accordingly, if the optical device is configured by using lenses having the same focal length or lens diameter, a coupling efficiency differs according to channel. As a result, if this optical device is used as an optical multiplexer or an optical demultiplexer, a large deviation in insertion loss is generated.

Figure 6:
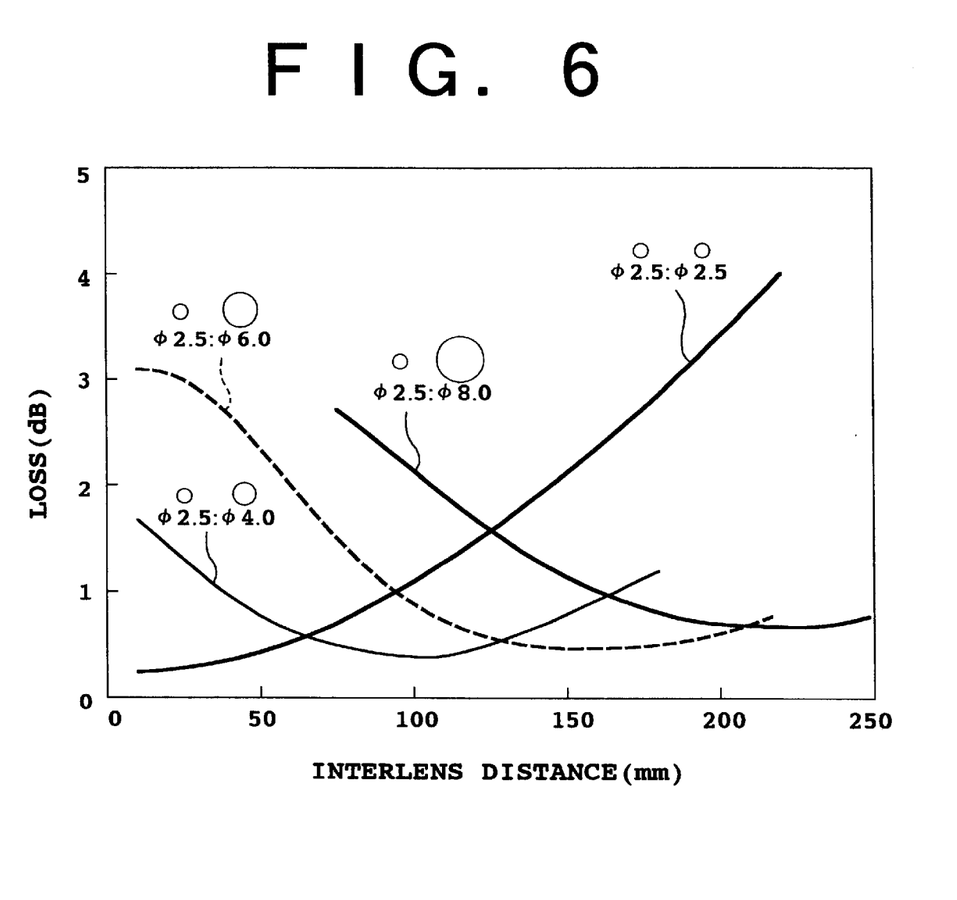
FIG. 6 is a graph showing the relation between coupling loss and interlens distance in the combination of various lenses.

FIG. 6 is a graph showing the relation between coupling loss and interlens distance in the case of combining various lenses. In FIG. 6, the vertical axis represents loss (dB), and the horizontal axis represents interlens distance (mm). More specifically, there are shown in FIG. 6 a characteristic in the combination of a pair of spherical lenses each having a diameter of 2.5 mm, a characteristic in the combination of a spherical lens having a diameter of 2.5 mm and a spherical lens having a diameter of 4.0 mm, a characteristic in the combination of a spherical lens having a diameter of 2.5 mm and a spherical lens having a diameter of 6.0 mm, and a characteristic in the combination of a spherical lens having a diameter of 2.5 mm and a spherical lens having a diameter of 8.0 mm. All of the spherical lens are formed of the same material. The comparison of these characteristics shows that the larger the diameter of one of the two combined lenses, the longer the interlens distance providing a minimum loss. Further, it is also understood that the minimum loss does not so differ according to the combination.

In consideration of the relations shown in FIGS. 5 and 6, the deviation in coupling loss can be suppressed by satisfying the conditions according to the above-mentioned aspect of the present invention. That is, in the optical device shown in FIG. 2, the coupling loss deviation can be suppressed by satisfying the first condition that the lens 46(#i) of the i-th fiber assembly 28(#i) has a focal length equal to or greater than that of the lens 46(#(i−1)) of the (i−1)-th fiber assembly 28(#(i−1)) and the second condition that the lens 46(#8) of the eighth (the N-th) fiber assembly 28(#8) has a focal length greater than that of the lens 46(#1) of the first fiber assembly 28(#1). Accordingly, it is possible to reduce the deviation in insertion loss in the case of using this optical device as an optical multiplexer or an optical demultiplexer. The second condition is significant to eliminate a possibility that all of the lenses 46(#1 to #8) may have the same focal length.

As apparent from FIG. 6, the coupling loss in each combination can be estimated to 1 dB or less by optimum design of the lenses according to the present invention. Accordingly, the insertion loss can be reduced as compared with the case of providing an optical multiplexer or an optical demultiplexer by using an AWG.

Particularly in the preferred embodiment shown in FIG. 2, the fiber assembly 30 is provided in addition to the fiber assemblies 28(#1 to #8). The beam B9 related to the fiber assembly 30 is provided by the optical signal having the wavelength λ9 in this preferred embodiment. Accordingly, no optical filter is required in the fiber assembly 30, thereby simplifying the configuration of the optical device.

Of the lenses 46(#1 to #8) and 56 of the fiber assemblies 28(#1 to #8) and 30, two to four lenses of the fiber assemblies related to neighboring wavelengths have the same focal length. Accordingly, the number of kinds of lenses to be used can be reduced to thereby effect cost reduction of the optical device.

While the lens 56 of the fiber assembly 30 has a focal length equal to that of the lens 46(#8) of the eighth (the N-th) fiber assembly 28(#8) in the above lens design, the focal length of the lens 56 may be greater than that of the lens 46(#8). Thus, by setting the focal length of the lens 56 of the fiber assembly 30 equal to or greater than the focal length of the lens 46(#8) of the eighth (the N-th) fiber assembly 28(#8), the deviation in insertion loss can be suppressed.

While the lens 36 of the fiber collimator 24 has a focal length smaller than that of the lens 46(#1) of the first fiber assembly 28(#1) in the above lens design, the focal length of the lens 36 may be almost equal to that of the lens 46(#1). Thus, by setting the focal length of the lens 36 of the fiber collimator 24 equal to or smaller than the focal length of the lens 46(#1) of the first fiber assembly 28(#1), an average insertion loss can be suppressed.

Since each of the lenses 36, 46(#1 to #8), and 56 is provided by a functionally spherical lens, the fiber collimator 24 and the fiber assemblies 28(#1 to #8) and 30 can be easily manufactured.

Since each of the lenses 46(#1 to #8) and 56 having relatively longer focal lengths is provided by removing the outer circumference of a spherical lens, sleeves having the same diameter can be used as the sleeves 40, 50(#1 to #8), and 60, thereby effecting easy manufacture and cost reduction of the optical device.

In the preferred embodiment shown in FIG. 2, the eight reflecting points provided by the optical filters 42(#1 to #8) are in substantially the same plane. Accordingly, the thickness of the optical device can be reduced and an angle of incidence of light upon each optical film can be easily set.

By arranging the odd-numbered fiber assemblies 28(#1, #3, #5, and #7) at substantially equal intervals and arranging the even-numbered fiber assemblies 28(#2, #4, #6, and #8) at substantially equal intervals, the beams B2, B4, B6, and B8 can be made substantially parallel to each other and the beams B3, B5, and B7 can be made substantially parallel to each other. Accordingly, the odd-numbered fiber assemblies become parallel to each other, and the even-numbered fiber assemblies become parallel to each other, thereby effecting easy handling of this optical device.

Since the fiber collimator 24 and the fiber assemblies 28(#1 to #8) and 30 are fixed to the housing 32, the relative positional relation among them can be maintained to thereby allow a stable operation of the optical device.

Since the optical filters 42(#1 to #8) have the different transmission bands TB1 to TB8 as mentioned above with reference to FIG. 3, this optical device can be applied to WDM. Specifically, this optical device can be used as the optical demultiplexer 20 shown in FIG. 1 in accordance with the above-mentioned operation of this optical device. It is accordingly possible to provide the terminal unit 4 for receiving WDM signal light and reproducing transmitted data according to an optical signal of each channel.

Further, since the optical device shown in FIG. 2 operates reversibly concerning the propagation of an optical signal of each channel, this optical device can be used also as the optical multiplexer 14 shown in FIG. 1. In this case, the fiber assemblies 28(#1 to #8) are optically connected to the optical transmitters 12(#1 to #N), respectively, and the fiber assembly 30 is optically connected to the optical transmitter 12(#(N+1)). Further, the WDM signal light obtained by WDM in the fiber assemblies 28(#1 to #8) and 30 is output from the fiber collimator 24. Thus, it is possible to provide the terminal unit 2 for transmitting the WDM signal light by using the optical device according to the present invention.

In the optical device shown in FIG. 2, the wavelength allocated to the i-th fiber assembly 28(#i) is longer than the wavelength allocated to the (i−1)-th fiber assembly 28(#(i−1)) as apparent from the wavelength arrangement shown in FIG. 3. Accordingly, the optical signals are sequentially dropped one by one during repetitions of reflection on the optical filters. Accordingly, a short-wave pass filter or a long-wave pass filter may be used as each optical filter, thereby allowing cost reduction of the optical device. This effect can be obtained also by setting the wavelength allocated to the i-th fiber assembly 28(#i) shorter than the wavelength allocated to the (i−1)-th fiber assembly 28(#(i−1)).

While the focal length of each lens is set according to the diameter of a spherical lens in this preferred embodiment, the focal length of each lens may be set according to the refractive index of a spherical lens with the lens diameter fixed. Alternatively, the focal length of each lens may be set according to both the lens diameter and the refractive index of a spherical lens. Further, each lens usable in the present invention is not limited to a spherical lens, but any other lenses such as a graded index type rod lens may be adopted.

Each of the optical filters 42(#1 to #8) may be configured by a glass substrate and a filter film such as a multilayer dielectric film formed on the glass substrate. In this case, each reflecting point of the reflected light path 26 is provided by the surface of the multilayer dielectric film. Each optical filter may be provided by an etalon plate.

Each of the optical filters 42(#1 to #8) has a reflecting surface for providing the reflected light path 26. By forming the reflecting surface of at least one of the fiber assembly 28(#1 to #8) into a concave surface, it is possible to provide an optical device suitable as an optical multiplexer and/or an optical demultiplexer reduced in insertion loss and in deviation in insertion loss as in the case of satisfying the above-mentioned first and second conditions according to the present invention. The reason for formation of the concave reflecting surface is to suppress or cancel beam divergence upon reflection of an optical beam on the concave reflecting surface. In modification, satisfaction of the first and second conditions and formation of the concave surface as at least one of the reflecting surfaces of the fiber assembly may be combined to carry out the present invention.

Since the average insertion loss by the optical device according to the present invention is small, the power of the WDM signal light output from the terminal unit 2 can be increased in the case of using the optical device according to the present invention as the optical multiplexer 14 shown in FIG. 1. Accordingly, the optical amplifier 16 may not be required. Further, in the case of using the optical device according to the present invention as the optical demultiplexer 20, the optical amplifier 18 may not be required.

In the case that the optical device according to the present invention is applied to each of the optical multiplexer 14 and the optical demultiplexer 20, there may arise a need that a deviation in so-called associated loss given by the sum of the insertion loss by the optical multiplexer 14 and the insertion loss by the optical demultiplexer 20 should be further reduced although the deviation in insertion loss is reduced by the present invention. There will now be described a preferred embodiment for responding to such a need with reference to FIG. 7.

Figure 7:
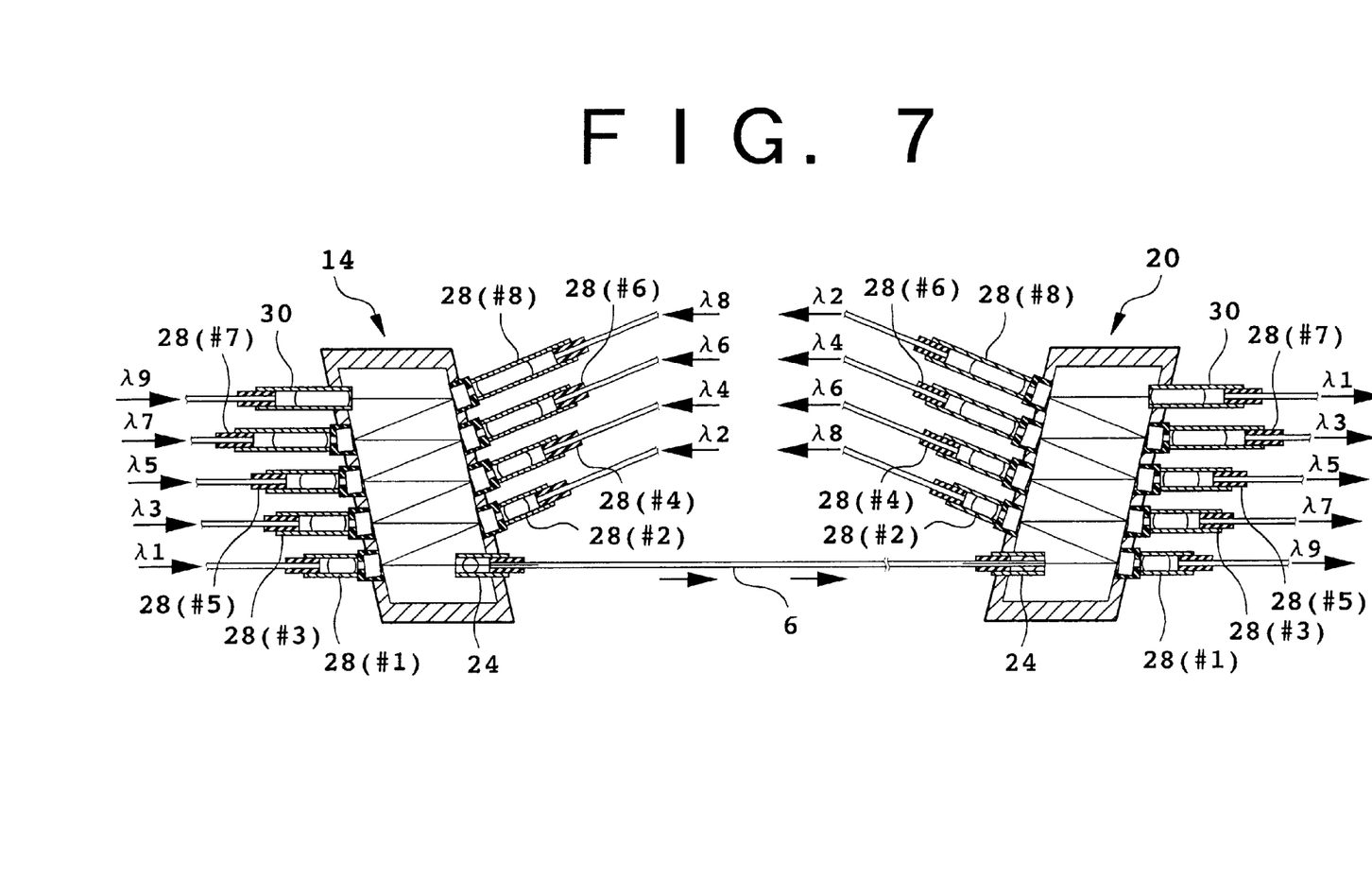
FIG. 7 is a schematic sectional view for illustrating an example of wavelength allocation in the system according to the present invention.

FIG. 7 is a schematic sectional view for illustrating an example of wavelength allocation in the optical fiber communication system according to the present invention. In FIG. 7, the optical multiplexer 14, the optical fiber transmission line 6, and the optical demultiplexer 20 are only shown, and the other components including the optical repeaters 8 are not shown. In this example, the optical device shown in FIG. 2 is used as the optical multiplexer 14, and an optical device obtained by modifying each optical filter of the optical device shown in FIG. 2 is used as the optical demultiplexer 20.

In the optical multiplexer 14, the wavelengths $\lambda 1$ to $\lambda 8$ are allocated to the fiber assemblies 28(#1 to #8), respectively, and the wavelength $\lambda 9$ is allocated to the fiber assembly 30. In the optical demultiplexer 20, the wavelengths $\lambda 9$ to $\lambda 2$ are allocated to the fiber assemblies 28(#1 to #8), respectively, and the wavelength $\lambda 1$ is allocated to the fiber assembly 30.

According to such wavelength allocation, the deviation in insertion loss in the optical multiplexer 14 can be canceled by the deviation in insertion loss in the optical demultiplexer 20, so that the deviation in associated loss can be greatly reduced.

According to an aspect of the present invention, there is provided a system wherein the wavelength allocated to the i-th fiber assembly 28(#i) of the optical device used in the terminal unit 2 is longer than the wavelength allocated to the (i−1)-th fiber assembly 28(#(i−1)) of this optical device, and the wavelength allocated to the j-th (j is an integer satisfying $2 \leq j \leq N$) fiber assembly 28(#j) of the optical device used in the terminal unit 4 is shorter than the wavelength allocated to the (j−1)-th fiber assembly 28(#(j−1)). Alternatively, the former condition and the latter condition may be reversed.

According to the present invention as described above, it is possible to provide an optical device suitable as an optical multiplexer and/or an optical demultiplexer reduced in insertion loss and in deviation in insertion loss. It is also possible to provide a terminal unit and a system each including such an optical device. The other effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:

a fiber collimator; and

N fiber assemblies (N is an integer greater than 1) sequentially optically coupled to said fiber collimator by a reflected light path of a substantially parallel beam;

said fiber collimator comprising an optical fiber and a lens opposed to said optical fiber;

each of said fiber assemblies comprising an optical filter to provide said reflected light path, an optical fiber optically coupled to said optical filter by its transmitted light path, and a lens provided between said optical filter and said optical fiber of each fiber assembly;

said lens of said i-th (i is an integer satisfying $2 \leq i \leq N$) fiber assembly having a focal length equal to or greater than that of said lens of said (i−1)-th fiber assembly;

said lens of said N-th fiber assembly having a focal length greater than that of said lens of said first fiber assembly.

2. An optical device according to claim 1, further comprising an additional fiber assembly optically coupled to said fiber collimator by said reflected light path;

said additional fiber assembly comprising an optical fiber and a lens opposed to said optical fiber of said additional fiber assembly.

3. An optical device according to claim 2, wherein said lens of said additional fiber assembly has a focal length equal to or greater than that of said lens of said N-th fiber assembly.

4. An optical device according to claim 1, wherein said lens of said fiber collimator has a focal length equal to or smaller than that of said lens of said first fiber assembly.

5. An optical device according to claim 1, wherein each of said lenses comprises a spherical lens.

6. An optical device according to claim 1, wherein of all said lenses, each of said lenses having relatively greater focal lengths is provided by removing an outer circumference of a spherical lens.

7. An optical device according to claim 1, wherein:
said reflected light path is provided by a plurality of reflecting points;
said plurality of reflecting points being in substantially the same plane.

8. An optical device according to claim 7, wherein:
said N is greater than 5;
said odd-numbered fiber assemblies being arranged at substantially equal intervals;
said even-numbered fiber assemblies being arranged at substantially equal intervals.

9. An optical device according to claim 1, further comprising a housing to which said fiber collimator and said fiber assemblies are fixed.

10. An optical device according to claim 1, wherein said optical filters have different transmission bands.

11. An optical device according to claim 10, wherein:
said fiber collimator is supplied with WDM signal light obtained by wavelength division multiplexing a plurality of optical signals having different wavelengths;
said optical signals being output from said fiber assemblies, respectively.

12. An optical device according to claim 10, wherein:
said fiber assemblies are supplied with a plurality of optical signals having different wavelengths, respectively;
said optical signals being wavelength division multiplexed to be output as WDM signal light from said fiber collimator.

13. An optical device according to claim 1, wherein each of said optical filters comprises a glass substrate and a multilayer dielectric film formed on said glass substrate.

14. An optical device according to claim 1, wherein each of said optical filters comprises an etalon plate.

15. An optical device according to claim 1, wherein:
each of said optical filters has a reflecting surface to provide said reflected light path;
at least one of said reflecting surfaces of said fiber assemblies being formed as a concave surface.

16. A terminal unit comprising:

a plurality of optical transmitters to output a plurality of optical signals having different wavelengths, respectively; and an optical multiplexer optically connected to said optical transmitters to output WDM signal light obtained by wavelength division multiplexing said optical signals;

said optical multiplexer comprising:
a fiber collimator; and
N fiber assemblies (N is an integer greater than 1) sequentially optically coupled to said fiber collimator by a reflected light path of a substantially parallel beam;
said fiber collimator comprising an optical fiber and a lens opposed to said optical fiber;
each of said fiber assemblies comprising an optical filter to provide said reflected light path, an optical fiber optically coupled to said optical filter by its transmitted light path, and a lens provided between said optical filter and said optical fiber of each fiber assembly;
said lens of said i-th (i is an integer satisfying $2 \leq i \leq N$) fiber assembly has a focal length equal to or greater than that of said lens of said (i−1)-th fiber assembly; and
said lens of said N-th fiber assembly has a focal length greater than that of said lens of said first fiber assembly;
said fiber assemblies being optically connected to said optical transmitters, respectively;
said WDM signal light being output from said fiber collimator.

17. A terminal unit according to claim 16, wherein:
each of said optical filters has a reflecting surface to provide said reflected light path;
at least one of said reflecting surfaces of said fiber assemblies being formed as a concave surface.

18. A terminal unit comprising:

an optical demultiplexer to receive WDM signal light obtained by wavelength division multiplexing and to separate said WDM signal light into a plurality of optical signals having different wavelengths; and a plurality of optical receivers optically connected to said optical demultiplexer to receive said optical signals, respectively;

said optical demultiplexer comprising:
a fiber collimator; and
N fiber assemblies (N is an integer greater than 1) sequentially optically coupled to said fiber collimator by a reflected light path of a substantially parallel beam;
said fiber collimator comprising an optical fiber and a lens opposed to said optical fiber;
each of said fiber assemblies comprising an optical filter to provide said reflected light path, an optical fiber optically coupled to said optical filter by its transmitted light path, and a lens provided between said optical filter and said optical fiber of each fiber assembly;
said lens of said i-th (i is an integer satisfying $2 \leq i \leq N$) fiber assembly has a focal length equal to or greater than that of said lens of said (i−1)-th fiber assembly; and said lens of said N-th fiber assembly has a focal length greater than that of said lens of said first fiber assembly;

said WDM signal light being supplied to said fiber collimator;

said fiber assemblies being optically connected to said optical receivers, respectively.

19. A terminal unit according to claim 18, wherein:

each of said optical filters has a reflecting surface to provide said reflected light path;

at least one of said reflecting surfaces of said fiber assemblies being formed as a concave surface.

20. A system comprising:

first and second terminal units adapted to wavelength division multiplexing; and an optical fiber transmission line connecting said first and second terminal units;

each of said first and second terminal units including an optical device comprising:
  a fiber collimator optically connected to said optical fiber transmission line; and
  N fiber assemblies (N is an integer greater than 1) sequentially optically coupled to said fiber collimator by a reflected light path of a substantially parallel beam;

said fiber collimator comprising an optical fiber and a lens opposed to said optical fiber;

each of said fiber assemblies comprising an optical filter to provide said reflected light path, an optical fiber optically coupled to said optical filter by its transmitted light path, and a lens provided between said optical filter and said optical fiber of each fiber assembly;

said lens of said i-th (i is an integer satisfying $2 \leq i \leq N$) fiber assembly has a focal length equal to or greater than that of said lens of said (i−1)-th fiber assembly; and said lens of said N-th fiber assembly has a focal length greater than that of said lens of said first fiber assembly.

21. A system according to claim 20, wherein:

each of said optical filters has a reflecting surface to provide said reflected light path;

at least one of said reflecting surfaces of said fiber assemblies being formed as a concave surface.

22. A system comprising:

first and second terminal units adapted to wavelength division multiplexing; and an optical fiber transmission line connecting said first and second terminal units;

each of said first and second terminal units including an optical device comprising:
  a fiber collimator optically connected to said optical fiber transmission line; and
  N fiber assemblies (N is an integer greater than 1) sequentially optically coupled to said fiber collimator by a reflected tight path of a substantially parallel beam;

said fiber collimator comprising an optical fiber and a lens opposed to said optical fiber;

each of said fiber assemblies comprising an optical filter to provide said reflected light path, an optical fiber optically coupled to said optical filter by its transmitted light path, and a lens provided between said optical filter and said optical fiber of each fiber assembly;

said optical filters have different transmission bands;

the wavelength allocated to said i-th (i is an integer satisfying $2 \leq i \leq N$) fiber assembly of said optical device of said first terminal unit being longer than the wavelength allocated to said (i−1)-th fiber assembly;

the wavelength allocated to said j-th a is an integer satisfying $2 \leq j \leq N$) fiber assembly of said optical device of said second terminal unit being shorter than the wavelength allocated to said (j−1)-th fiber assembly.

* * * * *

UNITED STATES PATENT AND TRADEMARK OFFICE
CERTIFICATE OF CORRECTION

PATENT NO.      : 6,515,776 B1                                          Page 1 of 1
DATED           : February 4, 2003
INVENTOR(S)     : Norihisa Naganuma It is certified that error appears in the above-identified patent and that said Letters Patent is hereby corrected as shown below:

<u>Column 14,</u>
Line 35, change "a" to -- (j --.

Signed and Sealed this

Twenty-fourth Day of June, 2003

JAMES E. ROGAN
*Director of the United States Patent and Trademark Office*